United States Patent
Matsumoto et al.

(10) Patent No.: US 10,896,676 B2
(45) Date of Patent: Jan. 19, 2021

(54) SERVER SYSTEM, INFORMATION SYSTEM, AND IN-VEHICLE APPARATUS

(71) Applicant: CLARION CO., LTD., Saitama (JP)

(72) Inventors: Yusuke Matsumoto, Saitama (JP); Makoto Orino, Hitachi (JP); Takuya Fujieda, Hitachi (JP); Kimio Okamoto, Saitama (JP); Noriyuki Abe, Saitama (JP)

(73) Assignee: CLARION CO., LTD., Saitama (JP)

( * ) Notice: Subject to any disclaimer, the term of this patent is extended or adjusted under 35 U.S.C. 154(b) by 133 days.

(21) Appl. No.: 16/087,571

(22) PCT Filed: Jan. 13, 2017

(86) PCT No.: PCT/JP2017/001047
§ 371 (c)(1),
(2) Date: Sep. 21, 2018

(87) PCT Pub. No.: WO2017/163551
PCT Pub. Date: Sep. 28, 2017

(65) Prior Publication Data
US 2019/0115020 A1    Apr. 18, 2019

(30) Foreign Application Priority Data

Mar. 23, 2016   (JP) .................................. 2016-058903

(51) Int. Cl.
*G06F 40/30* (2020.01)
*G06F 16/33* (2019.01)
(Continued)

(52) U.S. Cl.
CPC .............. *G10L 15/22* (2013.01); *G01C 21/26* (2013.01); *G01C 21/3605* (2013.01);
(Continued)

(58) Field of Classification Search
CPC ...... G06F 40/211; G06F 40/253; G06F 40/30; B60R 16/0373; G08G 1/00
See application file for complete search history.

(56) References Cited

U.S. PATENT DOCUMENTS 5,867,812 A * 2/1999 Sassano ................ G06F 40/247
704/10
6,751,452 B1 * 6/2004 Kupczyk .................. G08G 1/20
340/989

(Continued)

FOREIGN PATENT DOCUMENTS

EP     2854131 A1    4/2015
JP     2002-365062 A    12/2002
(Continued)

OTHER PUBLICATIONS

Japanese Office Action dated Feb. 4, 2020 regarding counterpart Japanese Patent Application No. 2016-058903 corresponding to U.S. Appl. No. 16/087,571 (9 pages) with English Translation (8 pages).

(Continued)

Primary Examiner — Lamont M Spooner
(74) Attorney, Agent, or Firm — Lewis Roca Rothgerber Christie LLP

(57) ABSTRACT

A server system includes: a related word storage unit that stores information representing a relation between a plurality of registered words; a content storage unit that stores information about a content corresponding to any one of the plurality of words; a communication unit that acquires an input word; a related word search unit that searches for a related word, which is related to the acquired input word, by using the related word storage unit; and a content determination unit that provides a user with any of information (Continued)

about a content corresponding to the input word and information about a content corresponding to the related word.

7 Claims, 10 Drawing Sheets

(51) Int. Cl.
*G10L 15/22* (2006.01)
*G06F 16/00* (2019.01)
*H04N 21/232* (2011.01)
*G01C 21/26* (2006.01)
*H04N 21/278* (2011.01)
*G06F 16/36* (2019.01)
*G01C 21/36* (2006.01)

(52) U.S. Cl.
CPC ..... *G01C 21/3691* (2013.01); *G01C 21/3697* (2013.01); *G06F 16/00* (2019.01); *G06F 16/3334* (2019.01); *G06F 16/367* (2019.01); *H04N 21/232* (2013.01); *H04N 21/278* (2013.01); *G10L 2015/228* (2013.01)

(56) References Cited

U.S. PATENT DOCUMENTS

| | | | | |
|---|---|---|---|---|
| 8,145,402 | B2* | 3/2012 | Craig | G01S 19/14 |
| | | | | 701/80 |
| 8,265,925 | B2* | 9/2012 | Aarskog | G06F 40/211 |
| | | | | 704/9 |
| 8,494,839 | B2* | 7/2013 | Kobayashi | G06F 40/268 |
| | | | | 704/10 |
| 9,310,802 | B1* | 4/2016 | Elkins | G05D 1/0027 |
| 2002/0188391 | A1 | 12/2002 | Takahashi et al. | |
| 2005/0108001 | A1* | 5/2005 | Aarskog | G06F 40/289 |
| | | | | 704/10 |
| 2005/0251385 | A1* | 11/2005 | Iwahashi | G06F 40/242 |
| | | | | 704/10 |
| 2005/0273251 | A1* | 12/2005 | Nix | G01C 21/3611 |
| | | | | 701/533 |
| 2008/0021860 | A1* | 1/2008 | Wiegering | G06F 16/951 |
| 2008/0162118 | A1* | 7/2008 | Itoh | G06F 40/284 |
| | | | | 704/10 |
| 2008/0167806 | A1* | 7/2008 | Wheeler | G01C 21/26 |
| | | | | 701/532 |
| 2008/0307356 | A1* | 12/2008 | Kawauchi | G01C 21/3679 |
| | | | | 715/810 |
| 2009/0024591 | A1* | 1/2009 | Miyasaka | G06F 16/50 |
| 2009/0248671 | A1* | 10/2009 | Maruyama | G06F 16/353 |
| 2009/0306989 | A1 | 12/2009 | Kaji | |
| 2010/0174528 | A1* | 7/2010 | Oya | G06F 40/268 |
| | | | | 704/10 |
| 2010/0228762 | A1* | 9/2010 | Mauge' | G06F 40/247 |
| | | | | 707/766 |
| 2011/0173002 | A1* | 7/2011 | Fujii | G10L 15/26 |
| | | | | 704/246 |
| 2013/0144805 | A1* | 6/2013 | Boling | G06Q 40/06 |
| | | | | 705/36 R |
| 2014/0018101 | A1* | 1/2014 | Namba | H04W 4/029 |
| | | | | 455/456.2 |
| 2015/0039292 | A1* | 2/2015 | Suleman | G06F 16/285 |
| | | | | 704/9 |
| 2015/0105976 | A1* | 4/2015 | Shikii | B60K 35/00 |
| | | | | 701/36 |
| 2016/0132485 | A1* | 5/2016 | Lee | G06F 40/284 |
| | | | | 704/10 |
| 2016/0325677 | A1* | 11/2016 | Fitch | G02B 27/0149 |
| 2017/0017392 | A1* | 1/2017 | Castaneda | B60K 35/00 |
| 2017/0197637 | A1* | 7/2017 | Yamada | G08G 1/167 |

FOREIGN PATENT DOCUMENTS

| | | | | |
|---|---|---|---|---|
| JP | 2004233542 | A | 8/2004 | |
| JP | 2004341724 | A * | 12/2004 | |
| JP | 2008282224 | A * | 11/2008 | G06F 16/29 |
| JP | 2009-134656 | A | 6/2009 | |
| JP | 2009134656 | A * | 6/2009 | |
| JP | 2011-215723 | A | 10/2011 | |
| JP | 2012-203974 | A | 10/2012 | |
| JP | 2015-52980 | A | 3/2015 | |
| WO | WO 2007/114226 | A1 | 10/2007 | |

OTHER PUBLICATIONS

International Written Opinion of corresponding PCT/JP2017/001047, dated Feb. 21, 2017, 6 pages.
International Search Report of corresponding PCT/JP2017/001047, dated Feb. 21, 2017, 5 pages.
European Search Report dated Aug. 21, 2019 regarding European Patent Application No. 17769598.8 corresponding to U.S. Appl. No. 16/087,571 (9 pages).

* cited by examiner

FIG.5

| ID | WORDS | RELATED WORD LISTS | | | | | PROVISIONAL REGISTRATION ADJUSTMENT COUNT |
|---|---|---|---|---|---|---|---|
| 1 | WEATHER | 2 | 3 | | | | COMPLETED |
| 2 | NEWS | 1 | 4 | | | | COMPLETED |
| 3 | TOURIST-SITE | 1 | 6 | | | | COMPLETED |
| 4 | SPORT | 2 | 5 | | | | COMPLETED |
| 5 | BALLPARK | 4 | 6 | | | | COMPLETED |
| 6 | FACILITY | 3 | 5 | 7 | 9 | 11 | COMPLETED |
| 7 | GAS-STATION | 6 | 8 | | | | COMPLETED |
| 8 | GASOLINE | 7 | | | | | COMPLETED |
| 9 | RESTAURANT | 6 | 10 | | | | COMPLETED |
| 10 | MEAL | 9 | | | | | COMPLETED |
| 11 | MAP | 6 | 12 | | | | COMPLETED |
| 12 | ROAD | 11 | 13 | | | | COMPLETED |
| 13 | TRAFFIC-JAM | 12 | | | | | COMPLETED |

(a) RELATED WORD DB

| ID | CONTENT NAME | CONNECTION WORD ID | CONNECTION WORD NAME | CONTENT ADDRESS |
|---|---|---|---|---|
| 1 | TRAFFIC INFORMATION | 13 | TRAFFIC-JAM | Http://aaa··· |
| 2 | SURROUNDING FACILITIES SEARCH | 11 | MAP | Http://bbb··· |
| 3 | GOURMET SEARCH | 10 | MEAL | Http://ccc··· |
| 4 | SPORT NEWS | 4 | SPORT | Http://ddd··· |
| 5 | NEWS | 2 | NEWS | Http://eee··· |
| 6 | WEATHER FORECAST | 1 | WEATHER | Http://fff··· |
| 7 | TOURING INFORMATION GUIDE | 3 | TOURIST-SITE | Http://ggg··· |
| 8 | GAS STATION SEARCH | 7 | GASOLINE | Http://hhh··· |

(b) CONTENT DB

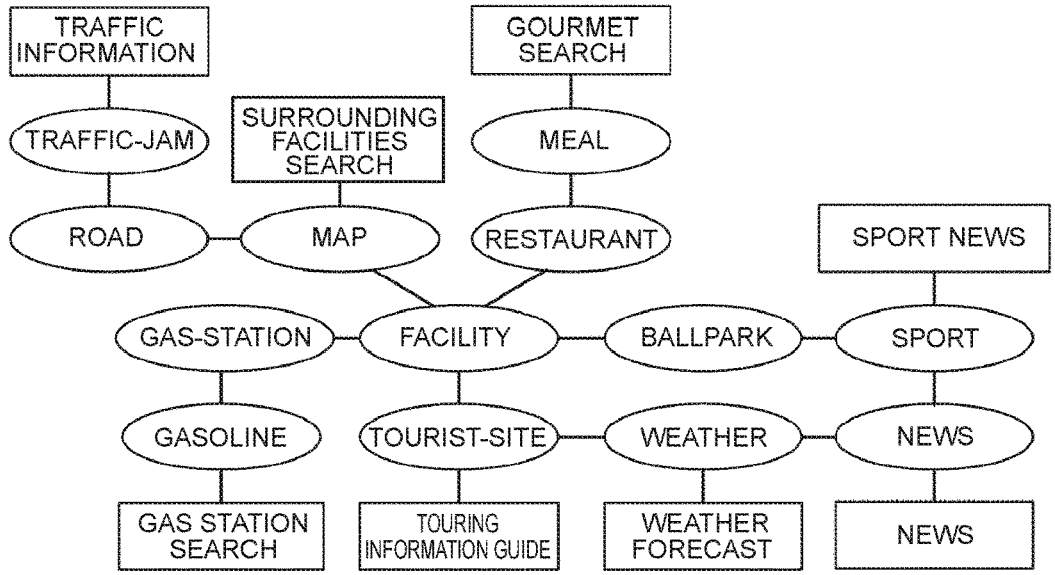

(c) RELATED WORD MAP

FIG.6

| VEHICLE STATUS | CONTENT | | | | | | | |
|---|---|---|---|---|---|---|---|---|
| | TOURING INFORMATION GUIDE | SURROUNDING FACILITIES SEARCH | GAS STATION SEARCH | GOURMET SEARCH | WEATHER FORECAST | TRAFFIC INFORMATION | NEWS | SPORT NEWS |
| PARKED | 5 | | | | 1 | | 3 | 2 |
| DRIVING | | 5 | | | | 3 | 1 | 2 |
| DESTINATION IS NOT SET | 5 | 3 | | | 1 | | | |
| DESTINATION HAS BEEN SET | | 5 | | | 1 | 3 | | |
| LOW FUEL LEVEL | 1 | | 5 | | | 3 | | |
| TIME OF DAY: DAYTIME | | 3 | | 5 | 1 | | | |
| WEATHER: RAIN | | 1 | | | 5 | 3 | | |
| IN TRAFFIC JAM | | 1 | | | | 5 | 3 | 2 |

(a) VEHICLE STATUS JUDGMENT DB

| VEHICLE STATUS | CONTENT | | | | | | | |
|---|---|---|---|---|---|---|---|---|
| | TOURING INFORMATION GUIDE | SURROUNDING FACILITIES SEARCH | GAS STATION SEARCH | GOURMET SEARCH | WEATHER FORECAST | TRAFFIC INFORMATION | NEWS | SPORT NEWS |
| PARKED | 5 | | | | 1 | | 3 | 2 |
| DRIVING | | 5 | | | | 3 | 1 | 2 |
| DESTINATION IS NOT SET | 5 | 3 | | | 1 | | | |
| DESTINATION HAS BEEN SET | | 5 | | | 1 | 3 | | |
| LOW FUEL LEVEL | 1 | | 5 | | | 3 | | |
| TIME OF DAY: DAYTIME | | 3 | | 5 | 1 | | | |
| WEATHER: RAIN | | 1 | | | 5 | 3 | | |
| IN TRAFFIC JAM | | 1 | | | | 5 | 3 | 2 |
| TOTAL WEIGHTING | 1 | 11 | 5 | 0 | 6 | 12 | 1 | 2 |
| PRIORITY | 6 | 2 | 4 | 8 | 3 | 1 | 6 | 5 |

(b) PRIORITY SETTING EXAMPLE

FIG.7
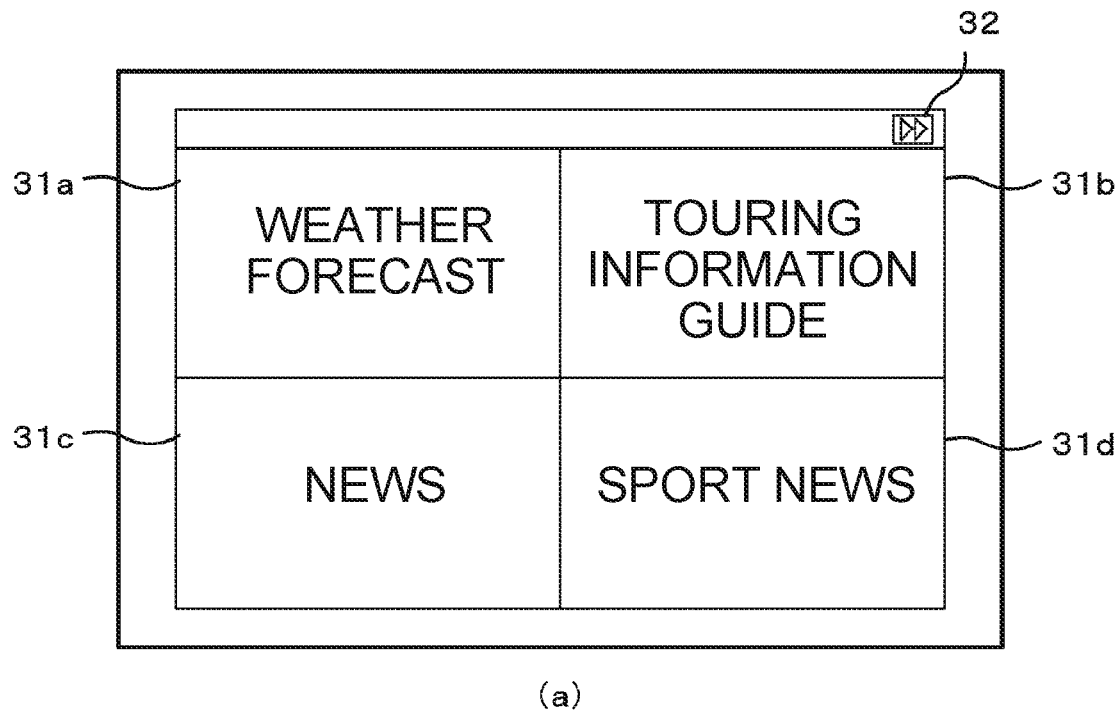
(a)
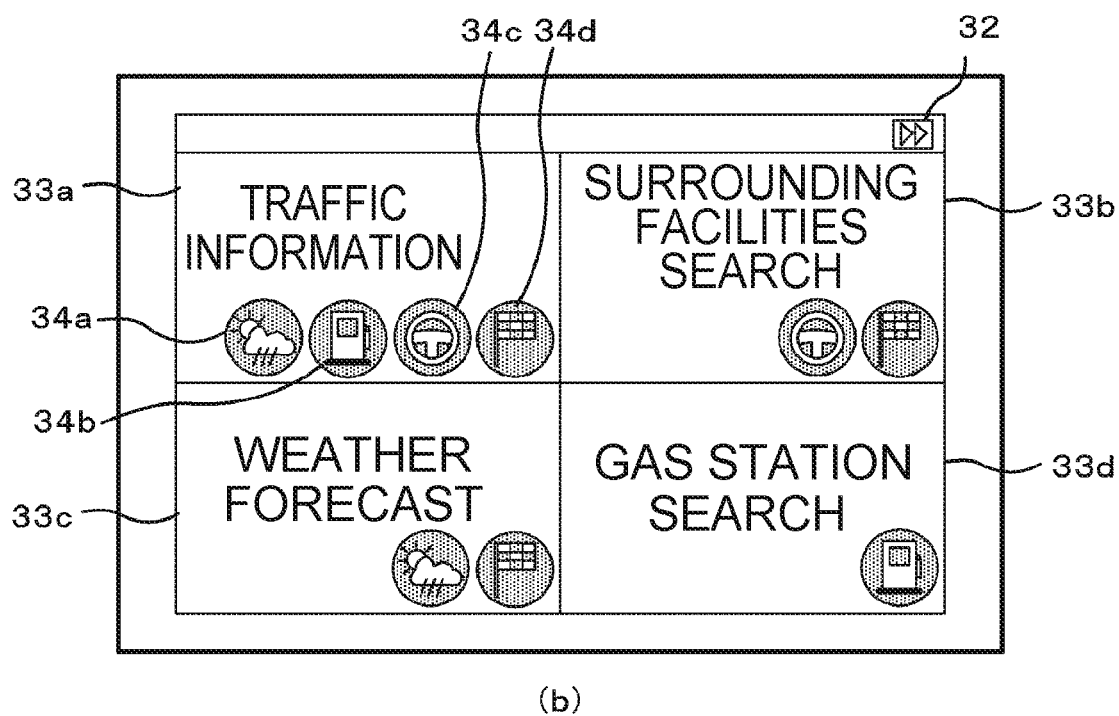
(b)

| ID | WORDS | RELATED WORD LISTS 42 | | | | | PROVISIONAL REGISTRATION ADJUSTMENT COUNT |
|---|---|---|---|---|---|---|---|
| 1 | WEATHER | 2 | 3 | 14 | | | COMPLETED |
| 2 | NEWS | 1 | 4 | | | | COMPLETED |
| 3 | TOURIST-SITE | 1 | 6 | | | | COMPLETED |
| 4 | SPORT | 2 | 5 | | | | COMPLETED |
| 5 | BALLPARK | 4 | 6 | | | | COMPLETED |
| 6 | FACILITY | 3 | 5 | 7 | 9 | 11 | COMPLETED |
| 7 | GAS-STATION | 6 | 8 | | | | COMPLETED |
| 8 | GASOLINE | 7 | | | | | COMPLETED |
| 9 | RESTAURANT | 6 | 10 | | | | COMPLETED |
| 10 | MEAL | 9 | | | | | COMPLETED |
| 11 | MAP | 6 | 12 | | | | COMPLETED |
| 12 | ROAD | 11 | 13 | | | | COMPLETED |
| 13 | TRAFFIC-JAM | 12 | | | | | COMPLETED |
| 14 | TRAVEL | 1 | | | | | 0 |

(a)

(b)

| PRIORITY | RELATED WORDS | CONTENT NAME | ROUTE FROM INPUT WORD | DISTANCE |
|---|---|---|---|---|
| 1 | WEATHER | WEATHER FORECAST | 14→1 | 1 |
| 2 | NEWS | NEWS | 14→1→2 | 2 |
| 2 | TOURIST-SITE | TOURING INFORMATION GUIDE | 14→1→3 | 2 |
| 4 | SPORT | SPORT NEWS | 14→1→2→4 | 3 |
| 5 | MAP | SURROUNDING FACILITIES SEARCH | 14→1→3→6→11 | 4 |
| 6 | GASOLINE | GAS STATION SEARCH | 14→1→3→6→7→8 | 5 |
| 6 | MEAL | GOURMET SEARCH | 14→1→3→6→9→10 | 5 |
| 8 | TRAFFIC-JAM | TRAFFIC INFORMATION | 14→1→3→6→11→1 | 6 |

(a)

(b)

SERVER SYSTEM, INFORMATION SYSTEM, AND IN-VEHICLE APPARATUS

CROSS-REFERENCE TO RELATED APPLICATION(S)

This application is a U.S. National Phase Patent Application and claims priority to and the benefit of International Application Number PCT/JP2017/001047, filed on Jan. 13, 2017, which claims priority of Japanese Patent Application Number 2016-058903, filed on Mar. 23, 2016, the entire contents of all of which are incorporated herein by reference.

TECHNICAL FIELD

The present invention relates to a server system, an information system, and an in-vehicle apparatus.

BACKGROUND ART

Conventionally, there has been known a system for automatically providing content according to the circumstances of a user who is driving a vehicle by connecting an in-vehicle apparatus and a smartphone with a server system via wireless communication (see PTL 1).

CITATION LIST

Patent Literature

PTL 1: Japanese Laid-Open Patent Publication No. 2015-52980

SUMMARY OF INVENTION

Technical Problem

The technology described in PTL 1 automatically provides the content according to the circumstances of the user regardless of whether or not the user actually made a demand to do so. Therefore, the content in which the user's demand is reflected appropriately can not always be provided.

Solution to Problem

According to a first embodiment of the present invention, a server system includes: a related word storage unit that stores information representing a relation between a plurality of registered words; a content storage unit that stores information about a content corresponding to any one of the plurality of words; a communication unit that acquires an input word; a related word search unit that searches for a related word, which is related to the acquired input word, by using the related word storage unit; and a content determination unit that provides a user with any of information about a content corresponding to the input word and information about a content corresponding to the related word.

According to a second embodiment of the present invention, the server system according to the first embodiment should preferably include a related word modification unit that registers the acquired input word in the related word storage unit in a state capable of changing association between the acquired input word and other words when the acquired input word is not registered in the related word storage unit, wherein the related word modification unit registers a word corresponding to content selected by the user, from among information about contents provided by the content determination unit, and the acquired input word in the related word storage unit by associating with each other.

According to a third embodiment of the present invention, it is preferable with the server system according to the second embodiment that when the acquired input word which is registered in the related word storage unit is acquired again, the related word modification unit should change the word associated with the input word in the related word storage unit.

According to a fourth embodiment of the present invention, it is preferable with the server system according to the third embodiment that the related word modification unit should limit the number of times the word associated with the acquired input word can be changed to a specified upper limit number of times or less.

According to a fifth embodiment of the present invention, it is preferable with the server system according to the first embodiment that when the acquired input word is registered in the related word storage unit, the content determination unit should set a priority to each content corresponding to the acquired input word or the related word on the basis of relevance to the acquired input word.

According to a sixth embodiment of the present invention, the server system according to the first embodiment should preferably further include a vehicle status judgment unit that judges a vehicle status; and a vehicle status judgment storage unit that stores a correspondence relationship between the vehicle status and the content, wherein when the acquired input word is not registered in the related word storage unit or the input word is not acquired, the content determination unit should preferably set a priority to each of contents corresponding to words registered in the related word storage unit on the basis of a vehicle status judged by the vehicle status judgment unit by using the vehicle status judgment storage unit.

According to a seventh embodiment of the present invention, an information system includes: a related word storage unit that stores information representing a relation between a plurality of registered words; a content storage unit that stores information about a content corresponding to any one of the plurality of words; an input receiving unit that receives an input from a user; a communication unit that acquires an input word based on the input from the user received by the input receiving unit; a related word search unit that searches for a related word, which is related to the acquired input word, by using the related word storage unit; a content determination unit that provides the user with any of information about a content corresponding to the input word or information about a content corresponding to the related word; and a content display control unit that causes a display monitor to display a content selection screen for selecting either the content corresponding to the acquired input word or the content corresponding to the related word on the basis of information about contents provided by the content determination unit and provides a content selected by the user on the content selection screen.

According to an eighth embodiment of the present invention, an in-vehicle apparatus includes: an input receiving unit that receives an input from a user; a vehicle information acquisition unit that acquires vehicle information about a vehicle status; a communication processing unit that transmits an input word based on the input from the user or the vehicle information and receives priorities which are set respectively to a plurality of contents corresponding to the input word or a related word, which is related to the input word, or a plurality of contents corresponding to the vehicle status; and a content display control unit that causes a display monitor to display a content selection screen for selecting either the plurality of contents corresponding to the input word or the related words or the plurality of contents corresponding to the vehicle status and provides a content selected by the user on the content selection screen.

According to a ninth embodiment of the present invention, it is preferable with the in-vehicle apparatus according to the eighth embodiment that the content selection screen for selecting any one of the plurality of contents corresponding to the vehicle status should display an icon representing the corresponding vehicle status with respect to each of the plurality of contents.

Advantageous Effects of Invention

The content in which the user's demand is reflected appropriately can be provided according to the present invention.

BRIEF DESCRIPTION OF DRAWINGS

FIG. 5 A diagram illustrating a specific example of a related word database and a content database;

FIG. 6 A diagram illustrating a specific example of a vehicle status judgment database;

FIG. 7 A diagram illustrating a specific example of a content selection screen;

DESCRIPTION OF EMBODIMENTS

Figure 1:
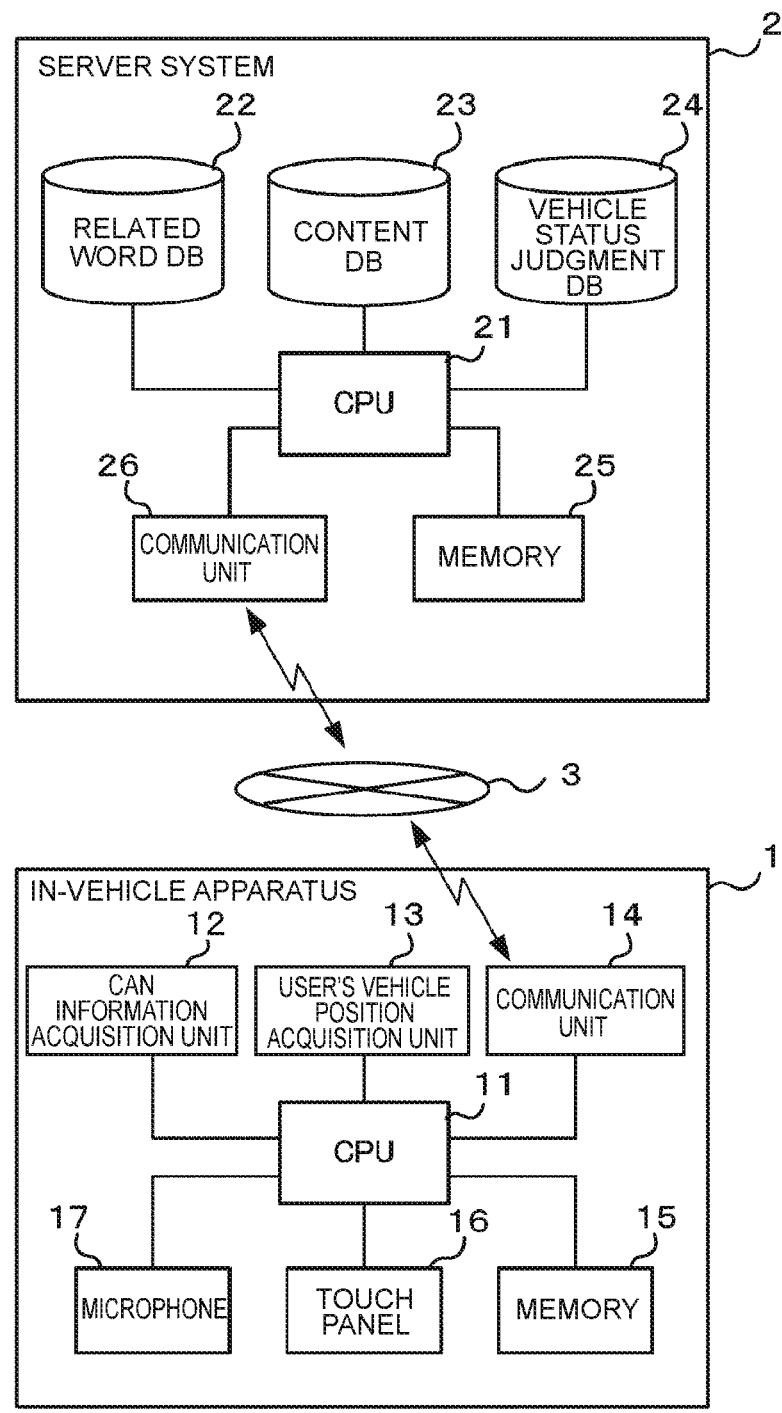
FIG. 1 A diagram illustrating the configuration of an information system according to an embodiment of the present invention.

FIG. 1 is a diagram illustrating the configuration of an information system according to an embodiment of the present invention. The information system illustrated in FIG. 1 is configured by connecting an in-vehicle apparatus 1 and a server system (or apparatus) 2 to each other via a public network 3. The in-vehicle apparatus 1 includes a CPU 11, a CAN information acquisition unit 12, a user's vehicle position acquisition unit 13, a communication unit 14, a memory 15, a touch panel 16, and a microphone 17. The server system 2 includes a CPU 21, a related word database 22, a content database 23, a vehicle status judgment database 24, a memory 25, and a communication unit 26.

The CPU 11 is configured by using, for example, a microprocessor and controls the operation of each of other parts of the in-vehicle apparatus 1. Note that the in-vehicle apparatus 1 may be configured to have a navigation function by enabling the CPU 1 to execute known processing such as map display processing, destination search processing, and route search processing. In this case, the in-vehicle apparatus 1 can acquire information such as a destination setting status by means of the navigation function.

The CAN information acquisition unit 12 acquires various information about the status of a user's vehicle via a CAN (Controller Area Network) provided in the vehicle which is equipped with the in-vehicle apparatus 1 and the user gets on (hereinafter the vehicle being referred to as the user's vehicle). For example, information such as an engine operation status, a travelling speed, and a remaining fuel amount of gasoline or the like can be acquired by the CAN information acquisition unit 12.

The user's vehicle position acquisition unit 13 acquires positional information of the user's vehicle. For example, the positional information of the user's vehicle can be acquired based on a GPS signal transmitted from a GPS satellite.

The communication unit 14 connects to the public network 3 via wireless communication and communicates with the server system 2 via the public network 3. The in-vehicle apparatus 1 can transmit and receive various information described later to and from the server system 2 by means of communication using the communication unit 14. Furthermore, when a navigation apparatus separately from the in-vehicle apparatus 1 is mounted in the user's vehicle, the communication unit 14 may have a function communicating with this navigation apparatus and the information such as the destination setting status may be acquired from the navigation apparatus.

The memory 15 stores various types of information such as programs to be executed by the CPU 11. The CPU 11 can execute various processing by using the information stored in the memory 15.

The touch panel 16 has a function as a display monitor to display various screens as controlled by the CPU 11 and also has a function as a detector for detecting the user's input operation. The content of the user's input operation detected by the touch panel 16 is analyzed by the CPU 11 on the basis of the display screen of the touch panel 16 at that time.

The microphone 17 detects a voice signal when the user speaks. The user's voice signal detected by the microphone 17 is analyzed by the CPU 11 and recognized as some word. Accordingly, an input word from the user is recognized by the in-vehicle apparatus 1.

The CPU 21 is configured by using, for example, a microprocessor and controls the operation of each of other parts of the server system 2.

The related word database 22 stores information indicating the relation between respective words with regard to a plurality of words registered in advance. The server system 2 can search for words which have a high relevance to the input word from the user, as the related words corresponding to the input word on the basis of the information stored in the related word database 22.

The content database 23 stores information of various contents which can be used by the in-vehicle apparatus 1. For example, information relating to the contents such as weather forecasts, traffic information, tourist information, facility information, and news of each local area is stored in the content database 23. The server system 2 can transmit the information of the various contents stored in the content database 23 to the in-vehicle apparatus 1 and provide the user with such information according to the input word from the user and the status of the user's vehicle.

The vehicle status judgment database 24 stores weighting information of each content which is set for each assumed status of the vehicle. The server system 2 can perform weighting according to the current status of the user's vehicle with respect to each content on the basis of the information stored in the vehicle status judgment database 24.

Note that the details of the related word database 22, the content database 23, and the vehicle status judgment database 24 mentioned above will be explained later with reference to FIG. 5 and FIG. 6.

The memory 25 stores various types of information such as programs to be executed by the CPU 21. The CPU 21 can execute various processing by using the information stored in the memory 25.

The communication unit 26 connects to the public network 3 by means of wireless communication and communicates with the in-vehicle apparatus 1 via the public network 3. The server system 2 can transmit and receive various information described later to and from the in-vehicle apparatus 1 by means of communication using the communication unit 26. For example, the server system 2 can acquire the input word by receiving information including the input word from the user, which is recognized by the in-vehicle apparatus 1, from the communication unit 26.

Figure 2:
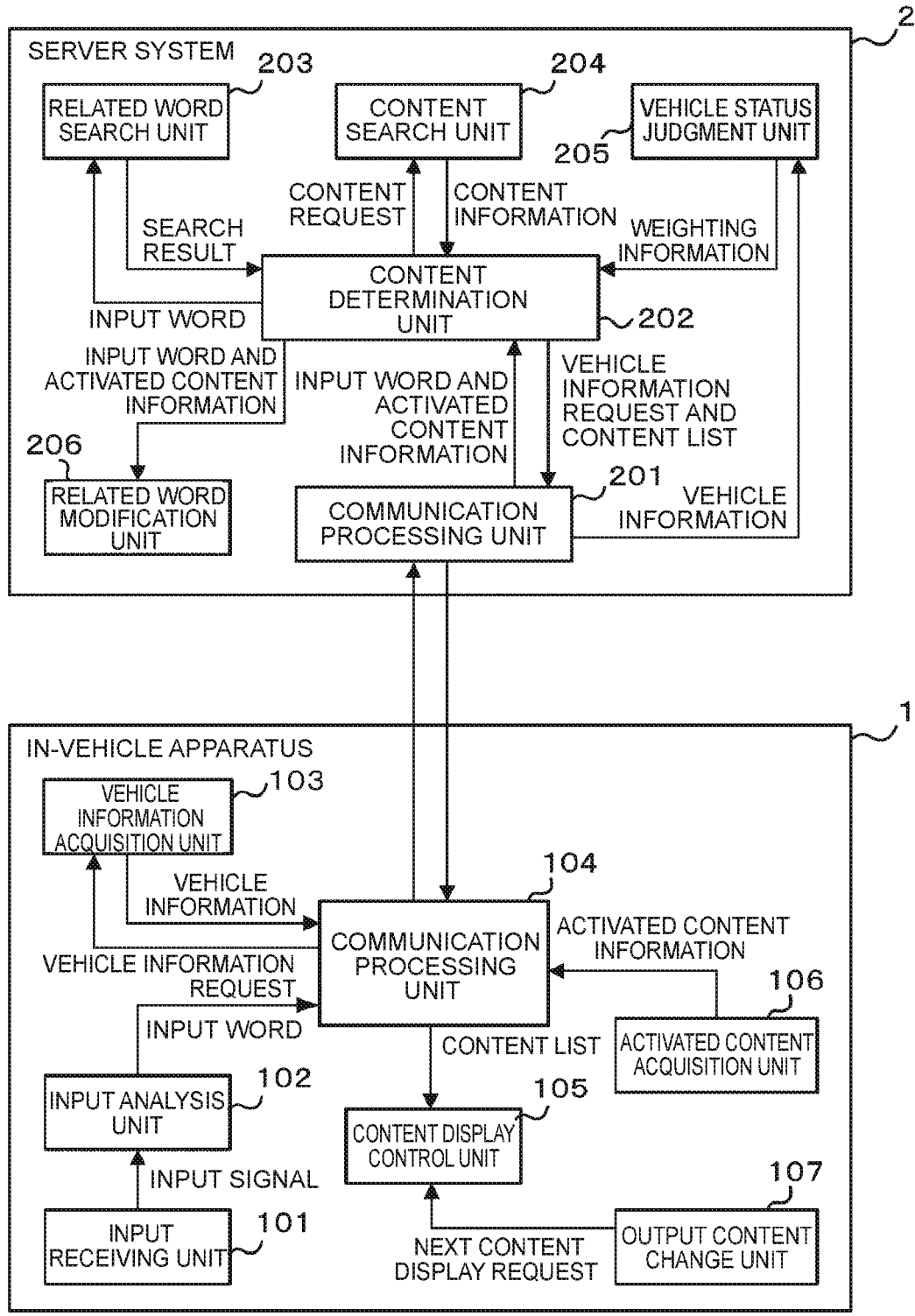
FIG. 2 A functional block diagram of the information system according to an embodiment of the present invention.

FIG. 2 is a functional block diagram of the information system according to an embodiment of the present invention. Referring to FIG. 2, the in-vehicle apparatus 1 has respective functions of an input receiving unit 101, an input analysis unit 102, a vehicle information acquisition unit 103, a communication processing unit 104, a content display control unit 105, an activated content acquisition unit 106, and an output content change unit 107. The server system 2 has respective functions of a communication processing unit 201, a content determination unit 202, a related word search unit 203, a content search unit 204, a vehicle status judgment unit 205, and a related word modification unit 206.

The input receiving unit 101 receives input from the user and outputs an input signal according to the input to the input analysis unit 102. The input receiving unit 101 corresponds to the touch panel 16 and the microphone 17 in FIG. 1.

The input analysis unit 102 analyzes the input word from the user on the basis of the input signal from the input receiving unit 101 and outputs the analysis result to the communication processing unit 104. For example, when the input signal from the input receiving unit 101 is a voice signal, the input analysis unit 102 executes well-known voice recognition processing based on the voice signal and thereby identifies a word spoken by the user and recognizes it as an input word. Note that the voice signal may be directly output to the communication processing unit 104 without analyzing the input word from the voice signal. Furthermore, when the input signal from the input receiving unit 101 is a detection signal of the touch panel, the input analysis unit 102 identifies a word input by the user to the tough panel on the basis of the detection signal and recognizes it as the input word. The input analysis unit 102 is implemented by, for example, processing executed by the CPU 11 in FIG. 1.

When a vehicle information request is output from the communication processing unit 104, the vehicle information acquisition unit 103 acquires vehicle information about the status of the user's vehicle in response to the vehicle information request and outputs the vehicle information to the communication processing unit 104. The vehicle information acquisition unit 103 corresponds to the CAN information acquisition unit 12, the user's vehicle position acquisition unit 13, and the communication unit 14 in FIG. 1 and acquires information such as the aforementioned information acquired via the CAN of the user's vehicle, positional information of the user's vehicle, and information indicative of the destination setting status as the vehicle information.

The communication processing unit 104 transmits the input word output from the input analysis unit 102 and the vehicle information output from the vehicle information acquisition unit 103 to the server system 2. Furthermore, when a content list and a vehicle information request are transmitted from the server system 2 in response to the transmission of the input word and the vehicle information, the communication processing unit 104 receives them and outputs them to the content display control unit 105 and the vehicle information acquisition unit 103. Note that the contest list transmitted from the server system 2 is a list of content information and priorities of the respective contents with respect to the plurality of contents. The communication processing unit 104 corresponds to the communication unit 14 in FIG. 1.

When the content list is output from the communication processing unit 104, the content display control unit 105 causes the touch panel 16 to display a content selection screen for selecting any one of the plurality of contents on the basis of the content list. Furthermore, when the user selects any one content on the displayed content selection screen and that content is thereby activated, various images and videos according to the activated content are displayed on the touch panel 16. Accordingly, the content display control unit 105 provides the user with various content. Note that the details of the content selection screen will be explained specifically later. The content display control unit 105 is implemented by, for example, the processing executed by the CPU 11.

When the content is activated as described above, the activated content acquisition unit 106 outputs activated content information for identifying the relevant content to the communication processing unit 104. When the activated content information is output from the activated content acquisition unit 106, the communication processing unit 104 transmits the activated content information to the server system 2. The activated content acquisition unit 106 is implemented by, for example, the processing executed by the CPU 11.

When the user gives an instruction to change the content which is a target to be selected on the aforementioned content selection screen, the output content change unit 107 detects the change instruction and outputs a display request regarding the next content to the content display control unit 105. When the next content display request is output from the output content change unit 107, the content display control unit 105 updates the content selection screen in response to the request. Note that the details of the content change instruction given by the user will be explained specifically later. The output content change unit 107 is implemented by, for example, the processing executed by the CPU 11.

The communication processing unit 201: receives the information of the input word and the activated content information, which have been transmitted from the in-vehicle apparatus 1, and outputs them to the content determination unit 202; and receives the vehicle information transmitted from the in-vehicle apparatus 1 and outputs it to the vehicle status judgment unit 205. Furthermore, when the content list and the vehicle information request are output from the content determination unit 202, the communication processing unit 201 transmits them to the in-vehicle apparatus 1. The communication processing unit 201 corresponds to the communication unit 26 in FIG. 1.

When the input word is output from the communication processing unit 201, the content determination unit 202 outputs the input word to the related word search unit 203 and requests a search for related words having a high relevance to the input word. When the search result of the related words according to the input word is output from the related word search unit 203, the content determination unit 202 determines, based on this search result, each of the plurality of contents corresponding to the input word or the related words to be a content information acquisition target.

On the other hand, when the related word search unit 203 fails to search for the related words corresponding to the input word, the content determination unit 202 outputs a vehicle information request to the communication processing unit 201 so that the communication processing unit 201 will transmit the vehicle information request to the in-vehicle apparatus 1. When the vehicle information of the user's vehicle is transmitted from the in-vehicle apparatus 1 in response to this vehicle information request, the vehicle status judgment unit 205 judges the status of the user's vehicle based on the vehicle information, and weighting information of each content according to the judgment result is output from the vehicle status judgment unit 205 to the content determination unit 202. Then, the content determination unit 202 determines, based on this weighting information, each of the plurality of contents corresponding to the status of the user's vehicle to be the content information acquisition target.

When the content which should be the content information acquisition target is determined by any one of the above-described methods, the content determination unit 202 outputs a content request for these contents to the content search unit 204. When content information is output from the content search unit 204 in response to this content request, the content determination unit 202 creates the content list as described above and outputs it to the communication processing unit 201.

Furthermore, when the activated content information is output from the communication processing unit 201, the content determination unit 202 outputs the activated content information together with the corresponding input word to the related word modification unit 206. The content determination unit 202 is implemented by, for example, the processing executed by the CPU 21 in FIG. 1.

When the input word is output from the content determination unit 202, the related word search unit 203 searches for the respective words related to any one of the contents, from among the words registered in the related word database 22 in FIG. 1, in descending order of the relevance to the input word as the related words. When a specified number of or all the related words have been successfully found by the search in the order of the relevance to the input word, the related word search unit 203 outputs the search result to the content determination unit 202. On the other hand, when the input word is not registered in the related word database 22 and any related words corresponding to the input word fail to be found by the search, the related word search unit 203 outputs information to that effect to the content determination unit 202.

When a content request is output from the content determination unit 202, the content search unit 204 extracts content information corresponding to the content request from among various pieces of content information stored in the content database 23 in FIG. 1. Then, the content search unit 204 outputs the extracted content information to the content determination unit 202.

When the vehicle information is output from the communication processing unit 201, the vehicle status judgment unit 205 judges the status of the user's vehicle on the basis of the vehicle information. The vehicle status judgment unit 205 judges the status of the user's vehicle by judging, for example, whether the user's vehicle is either parked or driving, whether the remaining fuel amount is low or not, whether the destination is set or not, or whether the vehicle is driving through a traffic jam section or not. When the status of the user's vehicle is thus judged, the vehicle status judgment unit 205 searches the information stored in the vehicle status judgment database 24 in FIG. 1 for the weighting information of each content according to the status of the user's vehicle and outputs the weighting information to the content determination unit 202.

When the input word and the activated content information are output from the content determination unit 202, the related word modification unit 206 changes (or modifies) the association between the input word and other words in the related word database 22 on the basis of these pieces of information.

Figure 3:
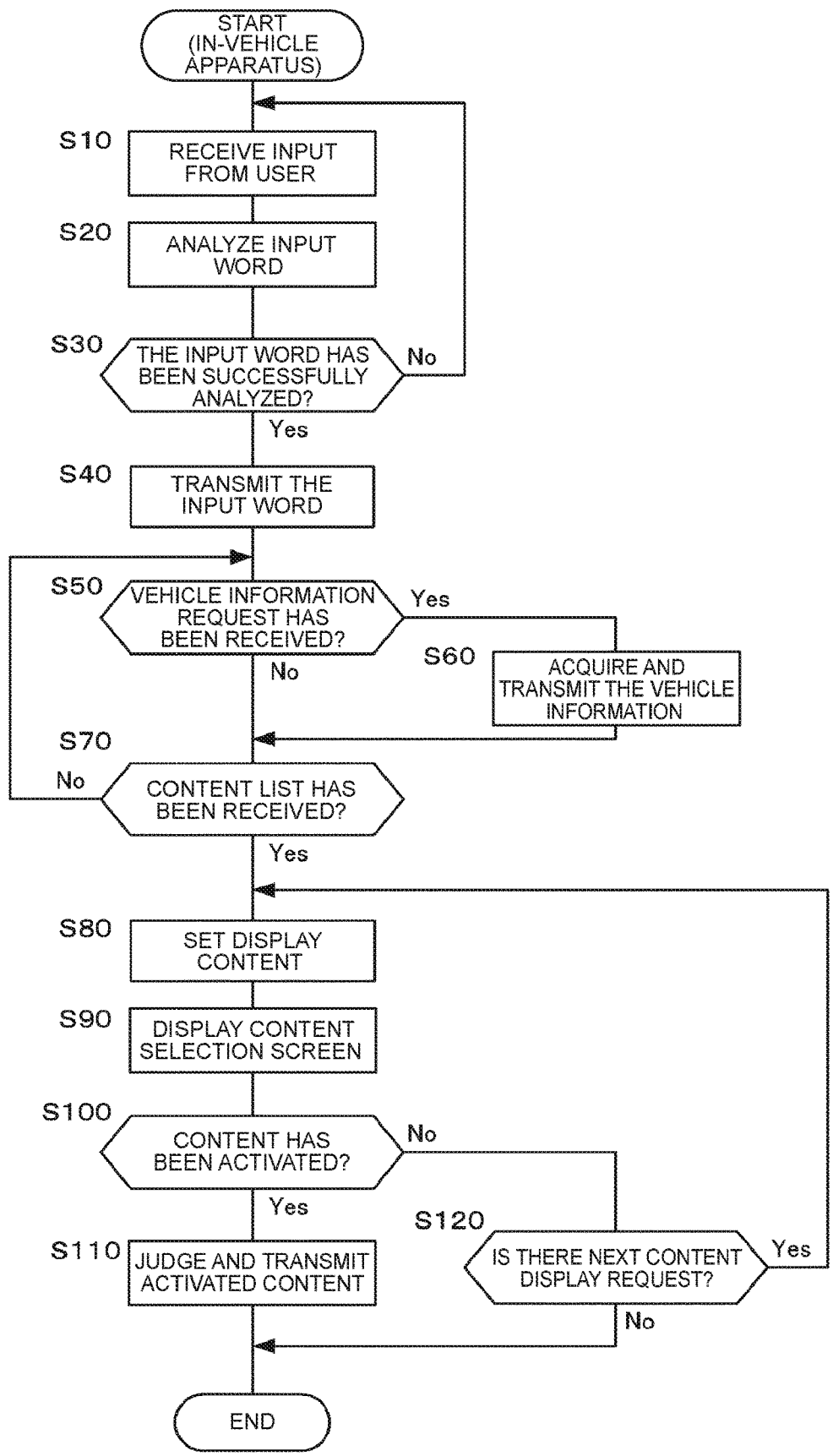
FIG. 3 A flowchart illustrating operation details of an in-vehicle apparatus.
Figure 4:
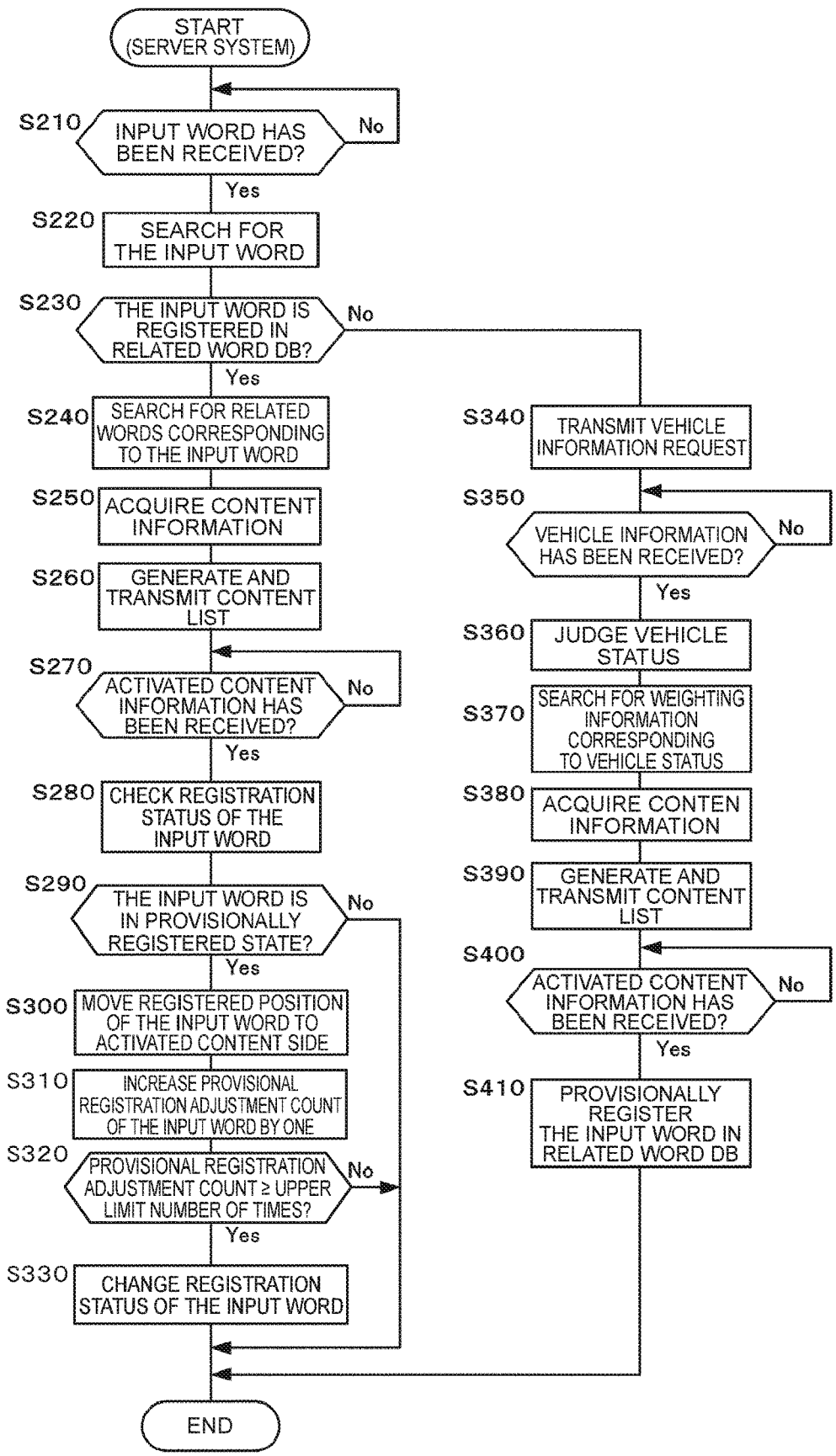
FIG. 4 A flowchart illustrating operation details of a server system.

Next, operations of the information system according to an embodiment of the present invention will be explained with reference to flowcharts in FIG. 3 and FIG. 4. FIG. 3 is a flowchart illustrating the operation details of the in-vehicle apparatus 1 and FIG. 4 is a flowchart illustrating the operation details of the server system 2. The in-vehicle apparatus 1 and the server system 2 can implement the operations indicated by these flowcharts by respectively executing the programs stored in the memories 15, 25.

Firstly, the flowchart in FIG. 3 will be explained. In step S10, the in-vehicle apparatus 1 causes the input receiving unit 101 in FIG. 2 to receive input from the user. Under this circumstance, the input from the user is received as mentioned earlier by acquiring, for example, the detection signal from the touch panel 16 and the voice signal from the microphone 17.

In step S20, the in-vehicle apparatus 1 causes the input analysis unit 102 to analyze the user's input word corresponding to the input received in step S10.

In step S30, the in-vehicle apparatus 1 judges whether or not the input word has been analyzed successfully in step S20. If the input word has been analyzed successfully, the in-vehicle apparatus 1 causes the processing to proceed to step S40; and if the input word has not been analyzed successfully, the in-vehicle apparatus 1 causes the processing to return to step S10 and receives the input from the user again.

In step S40, the in-vehicle apparatus 1 causes the communication processing unit 104 to transmit the input word from the user, which was analyzed in step S20, to the server system 2. Note that the input word which is transmitted here is received by the communication processing unit 201 of the server system 2 in step S210 in FIG. 4 which will be explained later.

In step S50, the in-vehicle apparatus 1 judges whether or not a vehicle information request has been received from the server system 2. Note that the server system 2 causes the communication processing unit 201 to transmit the vehicle information request in step S340 in FIG. 4 which will be explained later. If the vehicle information request has been received from the server system 2, the in-vehicle apparatus 1 causes the processing to proceed to step S60; and if the vehicle information request has not been received from the server system 2, the in-vehicle apparatus 1 causes the processing to proceed to step S70.

In step S60, the in-vehicle apparatus 1 causes the vehicle information acquisition unit 103 to acquire the vehicle information according to the current status of the user's vehicle and further causes the communication processing unit 104 to transmit the acquired vehicle information to the server system 2. Note that the vehicle information which is transmitted here is received by the communication processing unit 201 of the server system 2 in step S350 in FIG. 4 which will be explained later. After executing step S60, the in-vehicle apparatus 1 causes the processing to proceed to step S70.

In step S70, the in-vehicle apparatus 1 judges whether or not a content list has been received from the server system 2. Note that the server system 2 causes the communication processing unit 201 to transmit the content list in step S260 or S390 in FIG. 4 which will be explained later. If the content list has been received from the server system 2, the in-vehicle apparatus 1 causes the processing to proceed to step S80; and if the content list has not been received from the server system 2, the in-vehicle apparatus 1 causes the processing to return to step S50.

In step S80, the in-vehicle apparatus 1 causes the content display control unit 105 to set display contents on the content selection screen on the basis of the content list received from the server system 2 in step S70. Under this circumstance, a specified number of contents in descending order of priorities, for example, four contents are set as the display contents on the basis of the priorities of the respective contents included in the content list.

In step S90, the in-vehicle apparatus 1 causes the content display control unit 105 to have the touch panel 16 display the content selection screen for selecting any one of the plurality of contents on the basis of the setting result of the display contents in step S80. Under this circumstance, a screen in which select buttons corresponding to the respective display contents are placed in descending order of the priorities is displayed as the content selection screen.

In step S100, as the user selects the select button corresponding to any one content on the content selection screen displayed on step 90, the in-vehicle apparatus 1 thereby judges whether the relevant content has been activated or not. If the content has been activated, the in-vehicle apparatus 1 causes the processing to proceed to step S110; and if the content has not been activated, the in-vehicle apparatus 1 causes the processing to proceed to step S120.

In step S110, the in-vehicle apparatus 1 causes the activated content acquisition unit 106 to determine the content activated in step S100 and further causes the communication processing unit 104 to transmit the activated content information about the relevant content to the server system 2. Note that the activated content information which is transmitted here is received by the communication processing unit 201 of the server system 2 in step S400 in FIG. 4 which will be explained later. After executing step S110, the in-vehicle apparatus 1 terminates the processing indicated by the flowchart in FIG. 3.

In step S120, the in-vehicle apparatus 1 causes the output content change unit 107 to judge whether there is a display request for the next contents or not. If there is the next content display request, the in-vehicle apparatus 1 outputs the next content display request from the output content change unit 107 to the content display control unit 105 and then causes the processing to return to step S80 and reset the display contents. In this case, in step S80, the in-vehicle apparatus 1 causes the content display control unit 105 to reset the display contents by setting a specified number of contents with the second highest priority after the firstly set display contents. After resetting the display contents in step S80, the in-vehicle apparatus 1 causes the touch panel 16 to display the content selection screen according to the reset display contents in the next step S90. On the other hand, if there is no next content display request, the in-vehicle apparatus 1 terminates the processing indicated by the flowchart in FIG. 3.

Next, the flowchart in FIG. 4 will be explained. In step S210, the server system 2 judges whether or not the input word has been received from the in-vehicle apparatus 1. Note that the in-vehicle apparatus 1 causes the communication processing unit 104 to transmit the input word in step S40 in FIG. 3 as described earlier. When the input word is received from the in-vehicle apparatus 1, the server system 2 causes the processing to proceed to step S220.

In step S220, the server system 2 causes the related word search unit 203 to search the related word database 22 for the input word received in step S210.

In step S230, the server system 2 judges whether the input word is registered in the related word database 22 or not, on the basis of the input word search result in step S220. If the input word is registered in the related word database 22, the server system 2 causes the processing to proceed to step S240; and if the input word is not registered in the related word database 22, the server system 2 causes the processing to proceed to step S340. Note that also when no input word has been entered by the user and, therefore, the input word cannot be received in step S210, the server system 2 may make a negative judgment in step S230 and cause the processing to proceed to step S340.

When the processing proceeds from step S230 to step S240, in step S240 the server system 2 causes the related word search unit 203 to search the related word database 22 for related words corresponding to the input word received in step S210. Under this circumstance as described earlier, the respective words each associated with any one content are searched for, as the related words, in descending order of the relevance to the input word from among the words registered in the related word database 22.

In step S250, the server system 2 causes the content search unit 204 to identify the content corresponding to each of the searched related words on the basis of the search result in step S240 and acquires the content information about the relevant content from the content database 23. Under this circumstance, when the input word is directly associated with the content in the related word database 22, the content information of the content corresponding to the input word is also acquired from the content database 23.

In step S260, the server system 2 causes the content determination unit 202 to generate a content list which is information to provide the user with the contents corresponding to the input word on the basis of the search result of the related words in step S240 and the content information acquired in step S250. Under this circumstance, the priorities are set to the respective contents, which correspond to the input word or the related words and for which the content information was acquired in step S250, in descending order of the relevance to the input word. Then, a list of the content information and the set priorities for the respective contents is created, thereby generating the content list. Furthermore, the server system 2 causes the communication processing unit 201 to transmit the generated content list to the in-vehicle apparatus 1. Accordingly, either the content information about the content corresponding to the input word or the content information about the contents corresponding to the related words is provided to the user. Note that the content list which is transmitted here is received by the communication processing unit 104 of the in-vehicle apparatus 1 in step S70 in FIG. 3 as described earlier.

In step S270, the server system 2 judges whether or not the activated content information has been received from the in-vehicle apparatus 1. Note that the in-vehicle apparatus 1 causes the communication processing unit 104 to transmit the activated content information in step S110 in FIG. 3 as described earlier. If the activated content information has been received from the in-vehicle apparatus 1, the server system 2 causes the processing to proceed to step S280.

In step S280, the server system 2 causes the related word modification unit 206 to check a registration status of the input word received in step S210. Under this circumstance, whether the registration status of the input word in the related word database 22 is "provisionally registered" or "registered" is checked. Note that "provisionally registered" is a state where the input word is registered in the related word database 22 in a state capable of changing the association with other words as explained later in detail. On the other hand, "registered" is a registration state of the input word which is set after experiencing the above-described provisionally registered state and in which the association with other words can no longer be changed.

In step S290, the server system 2 judges whether the input word is in the provisionally registered state or not, on the basis of the check result in step S280. If the input word is in the provisionally registered state in the related word database 22, the server system 2 causes the processing to proceed to step S300. On the other hand, if the input word is not in the provisionally registered state, that is, if the input word is in the registered state and its association with other words cannot be changed, the server system 2 terminates the processing indicated by the flowchart in FIG. 4.

In step S300, the server system 2 causes the related word modification unit 206 to move a registered position of the input word in the related word database 22 in a direction closer to the activated content on the basis of the activated content information received in step S270. Accordingly, after the user enters the input word to the in-vehicle apparatus 1, the association between the input word and other words is changed according to the content provided as a result of the user's selection on the content selection screen displayed according to the input word. Note that a specific processing method to be performed at that time will be explained later in detail with reference to FIG. 10.

In step S310, the server system 2 causes the related word modification unit 206 to increase a provisional registration adjustment count of the input word, whose registered position was moved in step S300, by one. Note that the provisional registration adjustment count is a variable for limiting the number of times the association between the input word, which is provisionally registered in the related word database 22, and other words can be changed, to a specified upper limit number of times or less and an initial value of the provisional registration adjustment count is 0. Specifically speaking, the registered position of the input word in the provisionally registered state is moved by executing step 3300; and as a result, every time a word associated with the input word is changed, the provisional registration adjustment count of the input word is counted up from 0 one by one.

In step S320, the server system 2 judges whether or not the provisional registration adjustment count of the input word whose registered position was moved in step S300 is equal to or more than the specified upper limit number of times, for example, equal to or more than three. If the provisional registration adjustment count is equal to or more than the upper limit number of times, in step S330 the server system 2 causes the related word modification unit 206 to change the registration status of the input word from "provisionally registered" to "registered." Accordingly, the number of times the registered position of the input word can be moved in the related word database 22, that is, the number of times words associated with the input word can be changed is limited to the upper limit number of times or less. After executing step S330, the server system 2 terminates the processing indicated by the flowchart in FIG. 4. On the other hand, if the provisional registration adjustment count is less than the upper limit number of times, the server system 2 terminates the processing indicated by the flowchart in FIG. 4 without executing step S330.

When the processing proceeds from step S230 to step S340, the server system 2 causes the communication processing unit 201 to transmit a vehicle information request to the in-vehicle apparatus 1 in step S340. Under this circumstance, the server system 2 outputs the vehicle information request from the content determination unit 202 to the communication processing unit 201 and transmits the vehicle information request from the communication processing unit 201. Note that the vehicle information request which is transmitted here is received by the communication processing unit 104 of the in-vehicle apparatus 1 in step S50 in FIG. 3 as described earlier.

In step S350, the server system 2 judges whether the vehicle information has been received from the in-vehicle apparatus 1 or not. Note that the in-vehicle apparatus 1 transmits the vehicle information from the communication processing unit 104 in step S60 in FIG. 3 as described earlier. When the vehicle information is received from the in-vehicle apparatus 1, the server system 2 causes the processing to proceed to step S360.

In step S360, the server system 2 causes the vehicle status judgment unit 205 to judge the current status of the user's vehicle on the basis of the vehicle information received in step S350. Under this circumstance, the vehicle status judgment unit 205 judges the status of the user's vehicle as described earlier by judging, for example, whether the user's vehicle is either parked or driving, whether the remaining fuel amount is low or not, whether the destination is set or not, or whether the vehicle is driving through a traffic jam section or not.

In step S370, the server system 2 causes the vehicle status judgment unit 205 to search the vehicle status judgment database 24 for the weighting information corresponding to the status of the user's vehicle judged in step S360. Under this circumstance, the information stored in the vehicle status judgment database 24 is searched for the weighting information of each content according to the status of the user's vehicle.

In step S380, the server system 2 causes the content search unit 204 to acquire the content information about each content from the content database 23. Under this circumstance, all contents may be content information acquisition targets or only a specified number of contents in descending order of weighting may be the content information acquisition targets on the basis of the search result in step S370.

In step S390, the server system 2 causes the content determination unit 202 to generate a content list according to the status of the user's vehicle on the basis of the weighting information of each content searched in step 3370 and the content information acquired in step S380. Under this circumstance, the priorities are set respectively to the plurality of contents, which corresponds to any one of the words registered in the related word database 22 and for which the content information was acquired in step S380, in descending order of weighting according to the status of the user's vehicle. Then, a list of the content information and the set priorities for the respective contents is created, thereby generating the content list. Furthermore, the server system 2 causes the communication processing unit 201 to transmit the generated content list to the in-vehicle apparatus 1. Note that the content list which is transmitted here is received by the communication processing unit 104 of the in-vehicle apparatus 1 in step S70 in FIG. 3 as described earlier.

In step S400, the server system 2 judges whether the activated content information has been received from the in-vehicle apparatus 1 or not. Note that the in-vehicle apparatus 1 transmits the activated content information from the communication processing unit 104 in step S110 in FIG. 3 as described earlier. If the activated content information has been received from the in-vehicle apparatus 1, the server system 2 causes the processing to proceed to step 3410.

In step S410, the server system 2 causes the related word modification unit 206 to provisionally register the input word, which was received in step S210, in the related word database 22. Under this circumstance, the registration status of the input word is set as "provisionally registered" as mentioned earlier and the input word is added to the related word database 22. Accordingly, the input word is registered in the related word database 22 in the state capable of changing its association with other words. After executing step S410, the server system 2 terminates the processing indicated by the flowchart in FIG. 4.

Next, specific examples of the above-described operations of the information system will be explained below with reference to FIG. 5 to FIG. 10.

FIG. 5 is a diagram illustrating a specific example of the related word database 22 and the content database 23. The related word database 22 has, for example, each of the following words registered therein as illustrated in FIG. 5 (a): "weather," "news," "tourist-site," "sport," "ballpark," "facility," "gas-station," "gasoline," "restaurant," "meal," "map," "road," and "traffic-jam"; and information indicative of the relation between these words is recorded as related word lists. The related word lists in FIG. 5 (a) each indicate which word or words have the highest relevance to each relevant word by using the ID of each word. For example, the related word list shows that words with the highest relevance to the "weather" are the "news" with ID=2 and the "tourist-site" with ID=3.

The content database 23 has content information of each content of, for example, "traffic information," "surrounding facilities search," "gourmet search," "sport news," "news," "weather forecast," "touring information guide," and "gas-station search" as illustrated in FIG. 5 (b). The content information in FIG. 5 (b) indicates address information of a storage location of each content by using a content address and also indicates which word each content corresponds to by using a connection word D and a connection word name. For example, it can be seen by referring to the connection word D and the connection word name that a word corresponding to the "traffic information" is the "traffic-jam" with the D=13 in FIG. 5 (a).

FIG. 5 (c) shows a related word map corresponding to the details of FIG. 5 (a) and FIG. 5 (b). The relation between the respective words as represented in FIG. 5 (a) and the correspondence relationship between each content and the words as represented in FIG. 5 (b) can be expressed as the related word map as illustrated in FIG. 5 (c). The respective words indicated in FIG. 5 (a) are virtually located in this related word map so that the words with high relevance to each other are located adjacent to each other. Furthermore, each content indicated in FIG. 5 (b) is located adjacent to its corresponding word.

The related word search unit 203 in FIG. 2 can search for a word corresponding to any one content, as a related word, in descending order of the relevance to the input word by using the aforementioned information of the related word database 22 in step S240 in FIG. 4.

FIG. 6 is a diagram illustrating a specific example of the vehicle status judgment database 24. The vehicle status judgment database 24 has the weighting information of each content recorded therein as information indicative of the correspondence relationship with the content with respect to each vehicle status as follows as illustrated in FIG. 6 (a): "parked," "driving," "destination is not set," "destination has been set," "low fuel level," "time of day: daytime," "weather: rain," and "in traffic-jam." Note that a blank space in FIG. 6 (a) means that a weighting value is "0." For example, when the status of the user's vehicle is "parked," it is recorded as the weighting information that weighting values of the respective contents of the "touring information guide," "news," "sport news," and "weather forecast" are "5," "3," "2," and "1" respectively and the weighting value of other content is "0."

FIG. 6 (b) illustrates an example in which priorities according to the status of the user's vehicle are set to the respective contents by using the weighting information of the vehicle status judgment database 24 indicated in FIG. 6 (a). For example, when the status of the user's vehicle corresponds to "driving," "destination has been set," "low fuel level," and "weather: rain," the weighting values of the respective contents corresponding to these vehicle states are identified in the vehicle status judgment database 24 and the weighting values are added together to obtain a total weighting value for each content as indicated in FIG. 6 (b). Then, the priorities of the respective contents are set in descending order of the total weighting value. As a result, priority "1" is set to the "traffic information" with the highest total weighting value and priority "2" is set to the "surrounding facilities" with the second highest total weighting value. The same applies to other contents to set the priority to each content.

The vehicle status judgment unit 205 in FIG. 2 can search for the weighting information of each content according to the status of the user's vehicle by using the above-described information of the vehicle status judgment database 24 in step S370 in FIG. 4.

FIG. 7 is a diagram illustrating a specific example of a content selection screen. FIG. 7 (a) illustrates an example of the content selection screen displayed regarding each display content corresponding to the input word or the related words. Regarding the content selection screen in FIG. 7 (a), select buttons 31a to 31d corresponding to the respective contents "weather forecast," "touring information guide," "news," and "sport news" are displayed and a change button 32 to issue a content change instruction is displayed.

For example, when the "weather" is the input word and the information exemplified in FIG. 5 is stored in the related word database 22 and the content database 23, the content selection screen in FIG. 7 (a) is displayed on the touch panel 16 of the in-vehicle apparatus 1. The select button 31a is a button for selecting the content "weather forecast" corresponding to the input word "weather." The select buttons 31b, 31c are buttons for selecting the content "touring information guide" and "news" respectively corresponding to the related words "tourist-site" and "news" with the highest relevance to the input word "weather." The select button 31*d* is a button for selecting the content "sport news" corresponding to the related word "sport" with the second highest relevance.

FIG. 7 (*b*) illustrates an example of the content selection screen displayed regarding each display content corresponding to the status of the user's vehicle. Regarding the content selection screen in FIG. 7 (*b*), select buttons 33*a* to 33*d* corresponding to the respective contents "traffic information," "surrounding facilities search," "weather forecast," and "gas-station search" are displayed and the same change button 32 as shown in FIG. 7 (*a*) is displayed. Furthermore, regarding the select buttons 33*a* to 33*d*, at least one of icons 34*a* to 34*d* representing the status of the user's vehicle corresponding to the content represented by these select buttons 33*a* to 33*d* is displayed.

For example, when the status of the user's vehicle corresponds to "driving," "destination has been set," "low fuel level," and "weather: rain" and the information exemplified in FIG. 6 is stored in the vehicle status judgment database 24, the content selection screen in FIG. 7 (*b*) is displayed on the touch panel 16 of the in-vehicle apparatus 1. The select button 33*a* is a button for selecting the content "traffic information" corresponding to each vehicle state of "weather: rain," "low fuel level," "driving," and "destination has been set" and is displayed together with the icons 34*a* to 34*d* representing these vehicle states respectively. The select button 33*b* is a button for selecting the content "surrounding facilities search" corresponding to each vehicle state of "driving" and "destination has been set" and is displayed together with the icons 34*c*, 34*d* representing these vehicle states respectively. The select button 33*c* is a button for selecting the content "weather forecast" corresponding to each vehicle state of "weather: rain" and "destination has been set" and is displayed together with the icons 34*a*, 34*d* representing these vehicle states respectively. The select button 33*d* is a button for selecting the content "gas-station search" corresponding to the vehicle state of "low fuel level" and is displayed together with the icon 34*b* representing this vehicle state. Note that in the example of FIG. 7 (*b*), the vehicle status where the weighting value for each content is not 0 in FIG. 6 is set as the vehicle status corresponding to each content.

When the input word is registered in the related word database 22, the content display control unit 105 in FIG. 2 can display the content selection screen exemplified in FIG. 7 (*a*) in step S90 in FIG. 3. On the other hand, when the input word is not registered in the related word database 22 or has not been entered by the user, the content selection screen exemplified in FIG. 7 (*b*) can be displayed on the touch panel 16 in step S90 in FIG. 3. The user can activate any arbitrary content by pressing any one of the select buttons on theses content selection screens on the touch panel 16. Furthermore, by pressing the change button 32 on the touch panel 16, the user can make a next content display request, reset the display content, and cause the content selection screen for selecting another content to be displayed on the touch panel 16.

Figure 8:
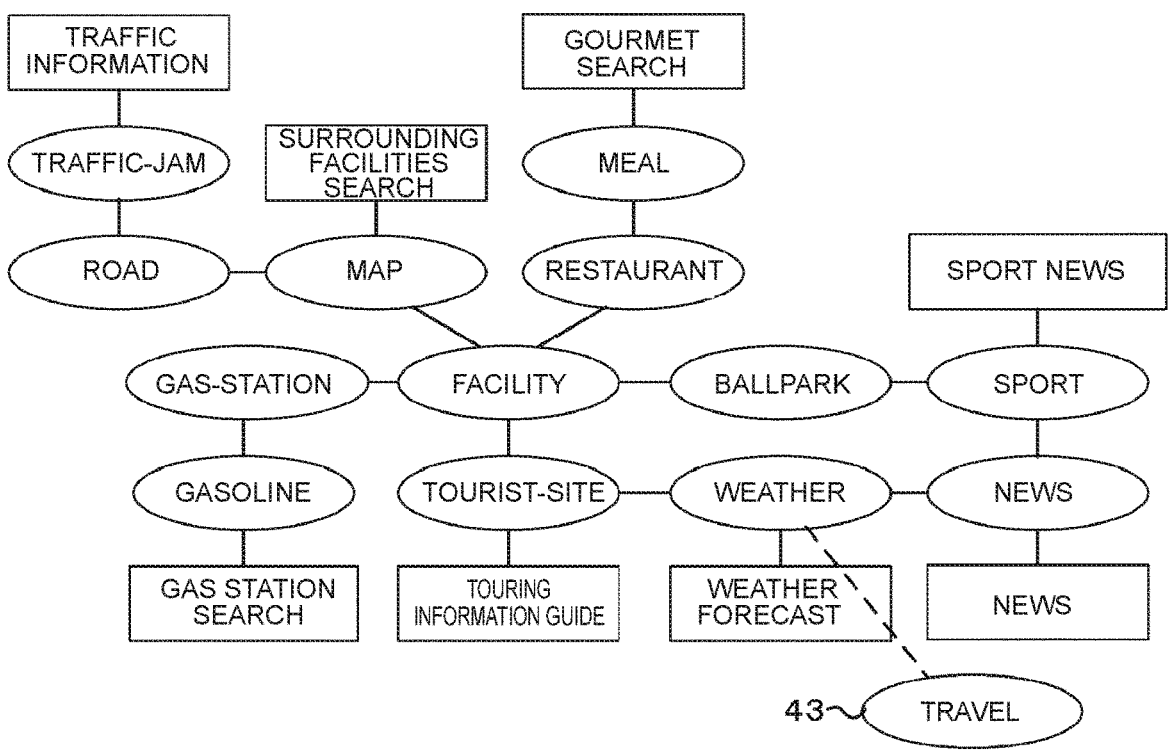
FIG. 8 A diagram for explaining a method for provisionally registering an input word in the related word database.

FIG. 8 is a diagram for explaining a method for provisionally registering an input word in the related word database 22. For example, when "travel" is entered as the input word and then the content "weather forecast" is selected and activated by the user, the server system 2 provisionally register the input word "travel" by associating it with the word "weather" corresponding to the content "weather forecast." Specifically speaking, as illustrated in FIG. 8 (*a*), row 41 corresponding to the input word "travel" is added to the related word database 22, the ID "1" of the word "weather" is set to the related word list and an initial value of the provisional registration adjustment count is set to "0." Furthermore, the ID "14" of the input word "travel" which has been provisionally registered is set, as indicated with reference numeral 42, in the related word list of the word "weather." Accordingly, the input word "travel" which has been provisionally registered is located adjacent to the word "weather" in the related word map as indicated with reference numeral 43 in FIG. 8 (*b*).

The related word modification unit 206 in FIG. 2 can provisionally register the input word in the related word database 22 in step S410 in FIG. 4 by the above-described method. Therefore, the word corresponding to the content selected by the user, from among the content information provided to the user via the content list, and the acquired input word can be associated with each other and registered in the related word database 22.

Figure 9:
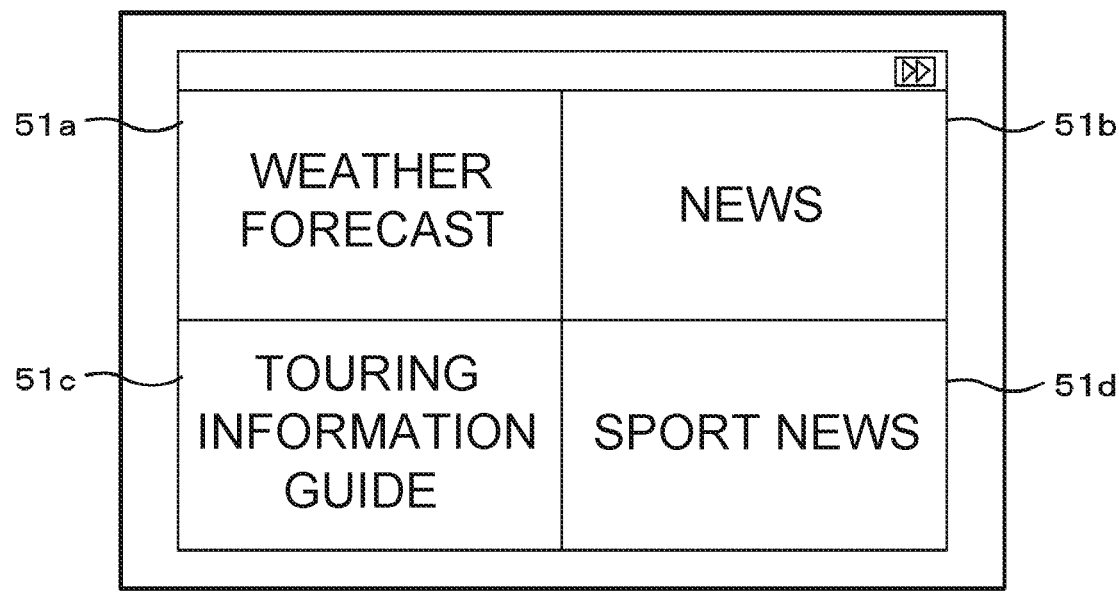
FIG. 9 A diagram for explaining a method for searching for related words when the provisionally registered input word is re-entered by a user.

FIG. 9 is a diagram for explaining a method for searching for related words when the provisionally registered input word is acquired again by the server system 2 as a result of re-entering of the provisionally registered input word by the user. For example, when the input word "travel" is provisionally registered in the related word database 22 as explained with reference to FIG. 8 and then this input word is acquired again, the server system 2 searches the related word database 22 for related words corresponding to the input word "travel." Specifically speaking, the related word database 22 exemplified in FIG. 8 (*a*) is searched for each word corresponding to any one content in descending order of the relevance to the input word "travel" as the related words. As a result, the respective related words "weather," "news," "tourist-site," "sport," "map," "gasoline," "meal," and "traffic-jam" are searched in ascending order of the distance from the input word "travel," that is, in ascending order of the number of routes and the priorities in accordance with such sequential order are set to the respective related words as illustrated in FIG. 9 (*a*).

Furthermore, after the content list corresponding the above-mentioned respective related words is transmitted from the server system 2 to the in-vehicle apparatus 1, the content selection screen as illustrated in FIG. 9 (*b*) is displayed on the touch panel 16 of the in-vehicle apparatus 1 on the basis of this content list. On the content selection screen in FIG. 9 (*b*), select buttons 51*a* to 51*d* for respectively selecting the respective contents "weather forecast," "news," "touring information guide," and "sport news" corresponding to the related words are displayed with respect to the respective four related words "weather," "news," "tourist-site," and "sport" in descending order of the priorities in FIG. 9 (*a*).

When the provisionally registered input word is acquired again, the related word search unit 203 in FIG. 2 can search for the related words corresponding to the input word by the above-described method in step S240 in FIG. 4.

Figure 10:
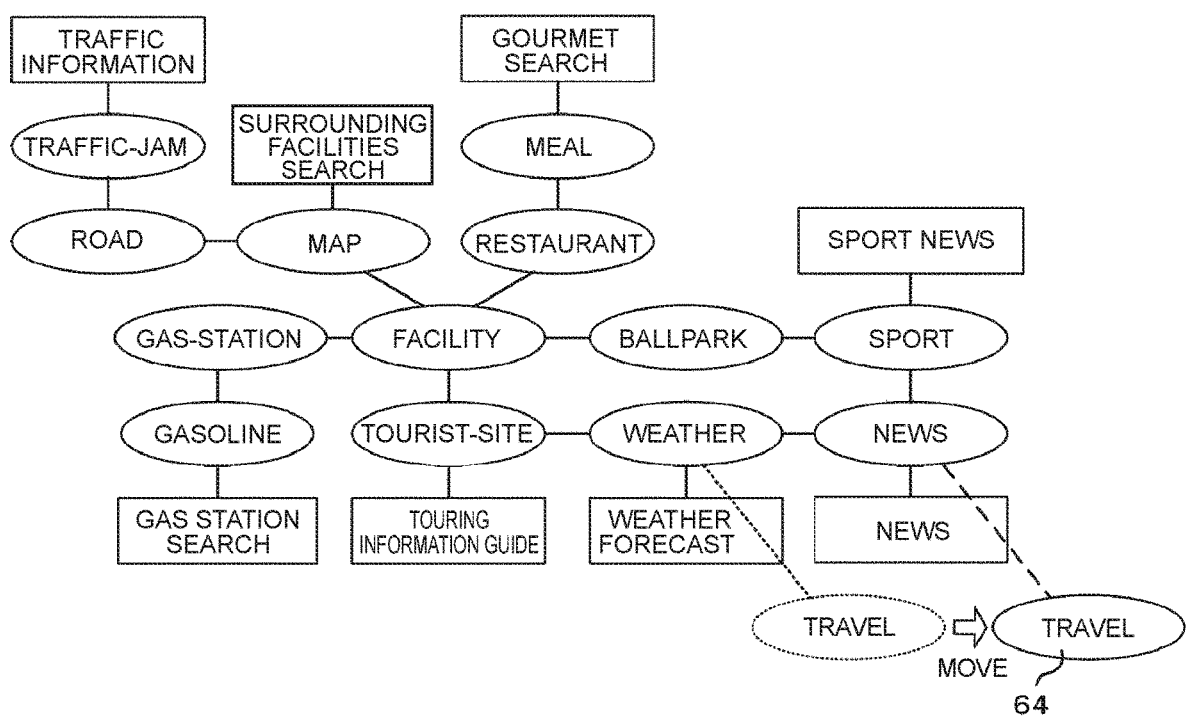
FIG. 10 A diagram for explaining a method for moving a registered position of the provisionally registered input word in the related word database.

FIG. 10 is a diagram for explaining a method for moving a registered position of the provisionally registered input word in the related word database 22. For example, when the input word "travel" is provisionally registered in the related word database 22 as explained with reference to FIG. 8 and this input word is further acquired again and then the content "news" is selected and activated by the user the server system 2 moves the registered position of the input word "travel" in the related word database 22 in a direction closer to the "news" which is the activated content. Specifically speaking, the content of the related word database 22 is changed from that illustrated in FIG. 8 (*a*) to that illustrated in FIG. 10 (*a*). Specifically speaking, the value of the input word "travel" in the related word list is changed to "2" which is the ID of the word "news" corresponding to the activated content as indicated with reference numeral 61 in FIG. 10 (*a*). Furthermore, the value of the provisional registration adjustment count is counted up to "1" as indicated with reference numeral 62. Furthermore, "14" which is the ID of the input word "travel" and is set in FIG. 8 (*a*) is deleted in the related word list of the word "weather"; and "14" which is the ID of the input word "travel" is newly set to the related word list of the word "news" as indicated with reference numeral 63. Accordingly, the input word "travel" which is provisionally registered is moved in a direction closer to the word "new" corresponding to the content selected and activated by the user in the related word map as indicated with reference numeral 64 in FIG. 10 (*b*).

The related word modification unit 206 in FIG. 2 can move the registered position of the provisionally registered input word in the related word database 22 according to the activated content and change the word associated with the input word by the above-described method in step S300 in FIG. 4.

Note that regarding the above-described example, the movement method has been explained about the case where the word "news" corresponding to the activated content is located adjacent to the word "weather," which is associated with the input word "travel," in the related word map. However, the positional relationship between these words is not necessarily as described above and the word corresponding to the activated content and the word associated with the input word may be sometimes located separately from each other. When the registered position of the input word is to be moved in such a case, it is preferable that the registered position of the input word should be moved by only a specified number of routes, for example, by only one route towards the word corresponding to the activated content. By doing so, the registered position of the input word can be adjusted according to the content selected and activated by the user in consideration of the relation between the respective words. Alternatively, the registered position of the input word may be moved so as to directly associate the input word with the word corresponding to the activated content without paying consideration to the relation between the respective words.

The following operations and effects can be achieved according to an embodiment of the present invention described above.

(1) The server system 2 includes: the related word database 22 that stores information indicative of the relation between a plurality of registered words; the content database 23 that stores information about the content corresponding to any one of the plurality of words; the communication unit 26 that acquires the input word; the related word search unit 203; and the content determination unit 202. The related word search unit 203 searches for the related words, which are related to the input word acquired by the communication unit 26, by using the related word database 22 (step S240). The content determination unit 202 generates a content list including either the content information about the content corresponding to the input word or the content information about the content corresponding to the related words found by the search, by using the content database 23 and provides the user with the generated content list (step S260). Accordingly, the content in which the user's demand is reflected appropriately can be provided.

(2) The server system 2 further includes the related word modification unit 206. When the acquired input word is not registered in the related word database 22 (step S230: No), the related word modification unit 206 provisionally registers the acquired input word in the related word database 22 in the state capable of changing the association between the acquired input word and other words (step S410). Accordingly, when a new input word is acquired, the related word database 22 can be updated according to the input word.

(3) When the input word which is provisionally registered in the related word database 22 is acquired again (step S290: Yes), the related word modification unit 206 changes the words associated with the input word in the related word database 22 (step S300). Accordingly, the registered position of the input word in the related word database 22 can be adjusted.

(4) The information stored in the related word database 22 represents a related word map, for example, as illustrated in FIG. 5 (*c*) in which a plurality of words are virtually located so that words which are highly related to each other are located adjacent to each other. After the input word is entered again, the related word modification unit 206 changes the words related to the input word in the related word database 22 so that the input word will be moved in a direction closer to the word corresponding to the content selected by the user on the related word map in step S300. Accordingly, the registered position of the input word in the related word database 22 can be adjusted in consideration of the relation between the respective words.

(5) The related word modification unit 206 limits the number of times the word associated with the input word is changed to a specified upper limit number of times or less (steps S310 to S330). Accordingly, the number of times the registered position of the input word in the related word database 22 is adjusted can be limited and it is possible to prevent the occurrence of the state in which the registered position of the input word will not be finalized indefinitely.

(6) When the input word is registered in the related word database 22 (step S230: Yes), the content determination unit 202 sets priorities of the respective contents corresponding to the input word or the related words on the basis of the relevance to the input word (step S260). Accordingly, the priority order of the respective contents can be set easily according to the input word.

(7) Furthermore, the server system 2 includes: the vehicle status judgment unit 205 that judges the status of the user's vehicle; and the vehicle status judgment database 24 that stores the correspondence relationship between the status of the user's vehicle and the content. When the input word is not registered in the related word database 22 or the input word has not been entered (step S230: No), the content determination unit 202 sets the priorities to the respective contents corresponding to the words registered in the related word database 22 by using the vehicle status judgment database 24 on the basis of the status of the user's vehicle judged by the vehicle status judgment unit 205 (step S390). Accordingly, even when the input word cannot be used, the priority order of the respective contents can be set easily according to the status of the user's vehicle.

(8) The information system configured of the in-vehicle apparatus 1 and the server system 2 includes the related word database 22, the content database 23, the communication unit 26, the related word search unit 203, and the content determination unit 202 mentioned above as well as the input receiving unit 101 that receives input from the user and the content display control unit 105. The content display control unit 105 causes the touch panel 16, which is a display monitor, to display the content selection screen for selecting either the content corresponding to the input word or the content corresponding to the related words on the basis of the content list generated by the content determination unit 202 (steps S80 and S90), thereby providing the content selected by the user on this content selection screen. Accordingly, the desired content can be easily provided to the user.

(9) The in-vehicle apparatus 1 includes: the input receiving unit 101 that receives the input from the user; the vehicle information acquisition unit 103 that acquires the vehicle information about the status of the user's vehicle; the communication processing unit 104; and the content display control unit 105. The communication processing unit 104 transmits the input word or the vehicle information based on the input from the user (steps S40 and S60) and receives, as the content list, a plurality of contents corresponding to the input word or the related words which are related to the input word, or the priorities which are set respectively to the plurality of contents corresponding to the status of the user's vehicle (step S70). The content display control unit 105 causes the touch panel 16, which is the display monitor, to display the content selection screen as illustrated respectively in FIG. 7 (*a*) and FIG. 7 (*b*) for selecting either the plurality of contents corresponding to the input word or the related words or the plurality of contents corresponding to the status of the user's vehicle on the basis of the received priorities (steps S80 and S90). Furthermore, the content display control unit 105 provides the content selected by the user on the displayed content selection screen. Accordingly, the desired content can be provided to the user.

(10) For example, on the content selection screen for selecting any one of the plurality of contents corresponding to the status of the user's vehicle as illustrated in FIG. 7 (*b*), at least one of the icons 34*a* to 34*d* indicating the corresponding status of the user's vehicle is displayed with respect to each of the plurality of contents. Accordingly, the user can easily determine which content corresponds to which vehicle state.

Note that how the functions of the in-vehicle apparatus 1 and the server system 2 are shared between them may be changed arbitrarily in the embodiment described above. For example, the input word may be analyzed by the server system 2 by providing the server system 2 with the input analysis unit 102 and transmitting an input signal, which is from the input receiving unit 101, from the communication processing unit 104 to the server system 2. Furthermore, all the functions of the server system 2 may be implemented by the in-vehicle apparatus 1. In this case, it is unnecessary to perform communication between the in-vehicle apparatus 1 and the server system 2, so that the communication processing units 104, 201 do not have to be provided. Besides this, various configurations are possible depending on how the functions of the in-vehicle apparatus 1 and the server system 2 are shared between them.

Furthermore, in the embodiment explained above, the content stored in the content database 23 of the server system 2 is provided to the user; however, other content may be provided to the user. For example, the present invention can be also applied when providing the content which is acquired externally or the content such as radio voices which can be provided within the vehicle.

The above-described embodiments and variations are merely examples and the present invention are not limited by the details of these examples unless the features of the invention are impaired. The present invention is not limited to the aforementioned embodiments and examples, but various changes can be made to the present invention within the scope not departing from the gist of the present invention.

The disclosure of the following priority application is herein incorporated by reference: Japanese Patent Application No. 2016-58903 (filed on Mar. 23, 2016).

REFERENCE SIGNS LIST

1 in-vehicle apparatus
2 server system
3 public network
11 CPU
12 CAN information acquisition unit
13 user's vehicle position acquisition unit
14 communication unit
15 memory
16 touch panel
17 microphone
21 CPU
22 related word database
23 content database
24 vehicle status judgment database
25 memory
26 communication unit
101 input receiving unit
102 input analysis unit
103 vehicle information acquisition unit
104 communication processing unit
105 content display control unit
106 activated content acquisition unit
107 output content change unit
201 communication processing unit
202 content determination unit
203 related word search unit
204 content search unit
205 vehicle status judgment unit
206 related word modification unit

The invention claimed is:

1. A server system comprising:
a related word memory that stores information representing relations between a plurality of registered words;
a content memory that stores information about a content corresponding to any one of the plurality of words;
a communication circuit that receives an input word;
a related word search circuit that searches for a related word, which is related to the received input word, in the related word memory;
a content determination circuit that provides the user with information about a content corresponding to the received input word and information about a content corresponding to the related word; and
a related word modification circuit that provisionally registers a newly received input word in the related word memory in a state capable of changing an association between the newly received input word and other words in the related word memory, when the newly received input word is not registered in the related word memory, wherein
the related word modification circuit provisionally registers a word corresponding to a content selected by the user, from information about contents provided by the content determination circuit and the newly received input word in the related word memory; and
wherein
when the newly received input word that has been provisionally registered in the related word memory is received again, the related word modification circuit changes the word associated with the newly received input word from the word corresponding to the content selected by the user to a word corresponding to a content newly selected by the user in the related word memory.

2. The server system according to claim 1, wherein:
the related word modification circuit limits a number of times the word associated with the received input word can be changed to a predetermined upper limit number of times or less.

3. The server system according to claim 1, wherein:
when the newly received input word is registered in the related word memory, the content determination circuit sets a priority to each content corresponding to the newly received input word or the related word, based upon relevance to the newly received input word.

4. The server system according to claim 1, further comprising:
a vehicle status judgment circuit that judges a vehicle status; and
a vehicle status judgment memory that stores a correspondence relationship between the vehicle status and the content, wherein:
when the newly received input word is not registered in the related word memory or an input word is not received, the content determination circuit sets a priority to each of contents corresponding to words registered in the related word memory, based upon a vehicle status judged by the vehicle status judgment circuit in the vehicle status judgment memory.

5. An information system comprising:
a related word memory that stores information representing a relation between a plurality of registered words;
a content memory that stores information about a content corresponding to any one of the plurality of words;
an input circuit that receives an input from a user;
a communication circuit that receives an input word based on the input from the user received by the input circuit;
a related word search circuit that searches for a related word, which is related to the received input word, in the related word memory;
a content determination circuit that provides the user with any of information about a content corresponding to the received input word or information about a content corresponding to the related word;
a related word modification circuit that provisionally registers a newly received input word in the related word memory in a state capable of changing an association between the newly received input word and other words in the related word memory, when the newly received input word is not registered in the related word memory, wherein
the related word modification circuit provisionally registers a word corresponding to a content selected by the user, from information about contents provided by the content determination circuit and the newly received input word in the related word memory; and wherein when the newly received input word that has been provisionally registered in the related word memory is received again, the related word modification circuit changes the word associated with the newly received input word from the word corresponding to the content selected by the user to a word corresponding to a content newly selected by the user in the related word memory; and
a content display controller that causes a display monitor to display a content selection screen for selecting the content corresponding to the newly received input word or the content corresponding to the related word based upon information about contents provided by the content determination circuit and provides a content selected by the user on the content selection screen.

6. An in-vehicle apparatus, comprising:
an input circuit that receives an input from a user;
a vehicle information acquisition circuit that acquires vehicle information about a vehicle status;
a communication circuit that transmits an input word based on the input from the user or the vehicle information and receives priorities which are set respectively to a plurality of contents corresponding to the input word or a related word, which is related to the input word, or a plurality of contents corresponding to the vehicle status;
a related word modification circuit that provisionally registers a newly received input word in the related word memory in a state capable of changing an association between the newly received input word and other words in the related word memory, when the newly received input word is not registered in the related word memory, wherein
the related word modification circuit provisionally registers a word corresponding to a content selected by the user, from information about contents provided by the content determination circuit and the newly received input word in the related word memory; and wherein
when the newly received input word that has been provisionally registered in the related word memory is received again, the related word modification circuit changes the word associated with the newly received input word from the word corresponding to the content selected by the user to a word corresponding to a content newly selected by the user in the related word memory; and
a content display controller that causes a display monitor to display a content selection screen for selecting either the plurality of contents corresponding to the newly input word or the related word or the plurality of contents corresponding to the vehicle status, and provides a content selected by the user on the content selection screen.

7. The in-vehicle apparatus according to claim 6, wherein:
the content selection screen for selecting any one of the plurality of contents corresponding to the vehicle status displays an icon representing the vehicle status with respect to each of the plurality of contents.

* * * * *